(12) United States Patent
Murakami

(10) Patent No.: US 12,489,389 B2
(45) Date of Patent: Dec. 2, 2025

(54) SOLAR CHARGING SYSTEM

(71) Applicant: TOYOTA JIDOSHA KABUSHIKI KAISHA, Toyota (JP)

(72) Inventor: Yukinori Murakami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 30 days.

(21) Appl. No.: 18/609,600

(22) Filed: Mar. 19, 2024

(65) Prior Publication Data

US 2024/0333196 A1 Oct. 3, 2024

(30) Foreign Application Priority Data

Mar. 28, 2023 (JP) ................. 2023-052053

(51) Int. Cl.
*H02S 10/20* (2014.01)
*B60L 53/51* (2019.01)
*B60L 58/13* (2019.01)
*B60L 58/20* (2019.01)
*H02J 7/34* (2006.01)
*H02J 7/35* (2006.01)

(52) U.S. Cl.
CPC .............. *H02S 10/20* (2014.12); *B60L 53/51* (2019.02); *B60L 58/13* (2019.02); *B60L 58/20* (2019.02); *H02J 7/342* (2020.01); *H02J 7/35* (2013.01)

(58) Field of Classification Search
CPC .......... B60L 53/51; H02S 10/00; H02S 10/20; H02S 40/38
See application file for complete search history.

(56) References Cited

U.S. PATENT DOCUMENTS

2020/0269720 A1* 8/2020 Enslin .................... B60L 53/68
2021/0107374 A1* 4/2021 Miyamoto ............. B60L 50/60

FOREIGN PATENT DOCUMENTS

JP 7180295 B2 11/2022

\* cited by examiner

*Primary Examiner* — Rexford N Barnie
*Assistant Examiner* — Terrence R Willoughby
(74) *Attorney, Agent, or Firm* — Oliff PLC

(57) ABSTRACT

A solar charging system includes a first battery, a second battery, and processing circuitry. The processing circuitry charges the second battery by supplying electric power from the first battery to the second battery when a state of charge of the first battery is greater than or equal to a prescribed upper limit value, and charges the first battery by stopping supply of electric power from the first battery to the second battery when the state of charge of the first battery is less than or equal to a prescribed lower limit value. A range from the upper limit value to the lower limit value is a range of use of the first battery. The processing circuitry changes the range of use such that the range of use is wider when a degree of degradation of the first battery is high than when the degree of degradation is low.

7 Claims, 3 Drawing Sheets

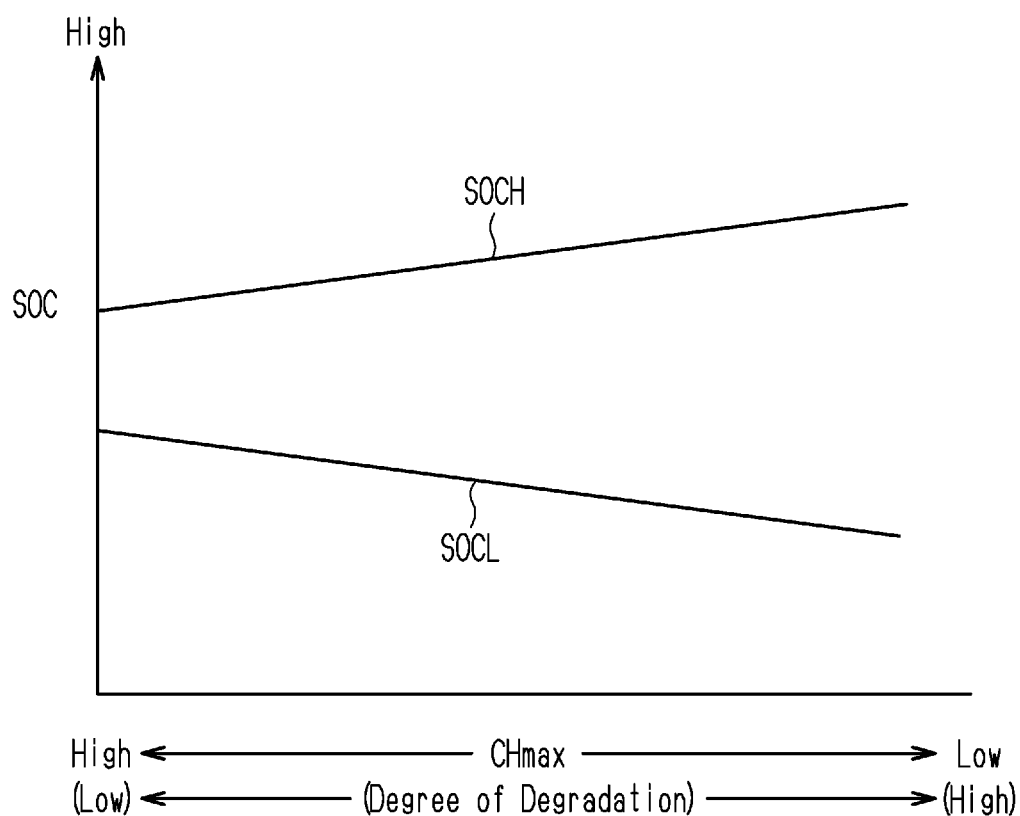

SOLAR CHARGING SYSTEM

BACKGROUND

Field

The present disclosure relates to a solar charging system.

Description of Related Art

A solar charging system described in Japanese Patent No. 7180295 includes a solar panel, a first battery, a second battery, and a controller that controls charging of the first battery and the second battery. The first battery stores electric power generated by the solar panel. The second battery stores electric power supplied from the first battery. When the state of charge of the first battery is greater than or equal to a prescribed upper limit value, the controller charges the second battery by supplying electric power from the first battery to the second battery. The controller charges the first battery by stopping supply of electric power from the first battery to the second battery when the state of charge of the first battery is less than or equal to a prescribed lower limit value due to supply of electric power to the second battery.

The full charge capacity of a battery gradually decreases due to degradation. Therefore, when the range from the upper limit value to the lower limit value of the state of charge of the battery described above is used as the range of use of the battery, the capacity range of the battery in the range of use becomes narrower as the degradation of the battery progresses. This reduces the amount of electric power that can be actually used in the charging cycle of the first battery, in which charging and discharging are repeated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a solar charging system includes a solar panel, a first battery configured to store electric power generated by the solar panel, a second battery configured to store electric power supplied from the first battery, and processing circuitry. The processing circuitry is configured to charge the second battery by supplying electric power from the first battery to the second battery when a state of charge of the first battery is greater than or equal to a prescribed upper limit value, and charge the first battery by stopping supply of electric power from the first battery to the second battery when the state of charge of the first battery is less than or equal to a prescribed lower limit value. A range from the upper limit value to the lower limit value of the state of charge of the first battery is a range of use of the first battery. The processing circuitry is configured to execute a changing process of changing the range of use such that the range of use is wider when a degree of degradation of the first battery is high than when the degree of degradation is low.

Other features and aspects will be apparent from the following detailed description, the drawings, and the claims.

BRIEF DESCRIPTION OF THE DRAWINGS

FIG. 4 is a graph showing how an upper limit value and a lower limit value are set in a modification.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Schematic Configuration of Solar Charging System

Hereinafter, an embodiment of a solar charging system will be described with reference to FIGS. 1 and 2. The solar charging system of the present embodiment is mounted on a vehicle.

Figure 1:
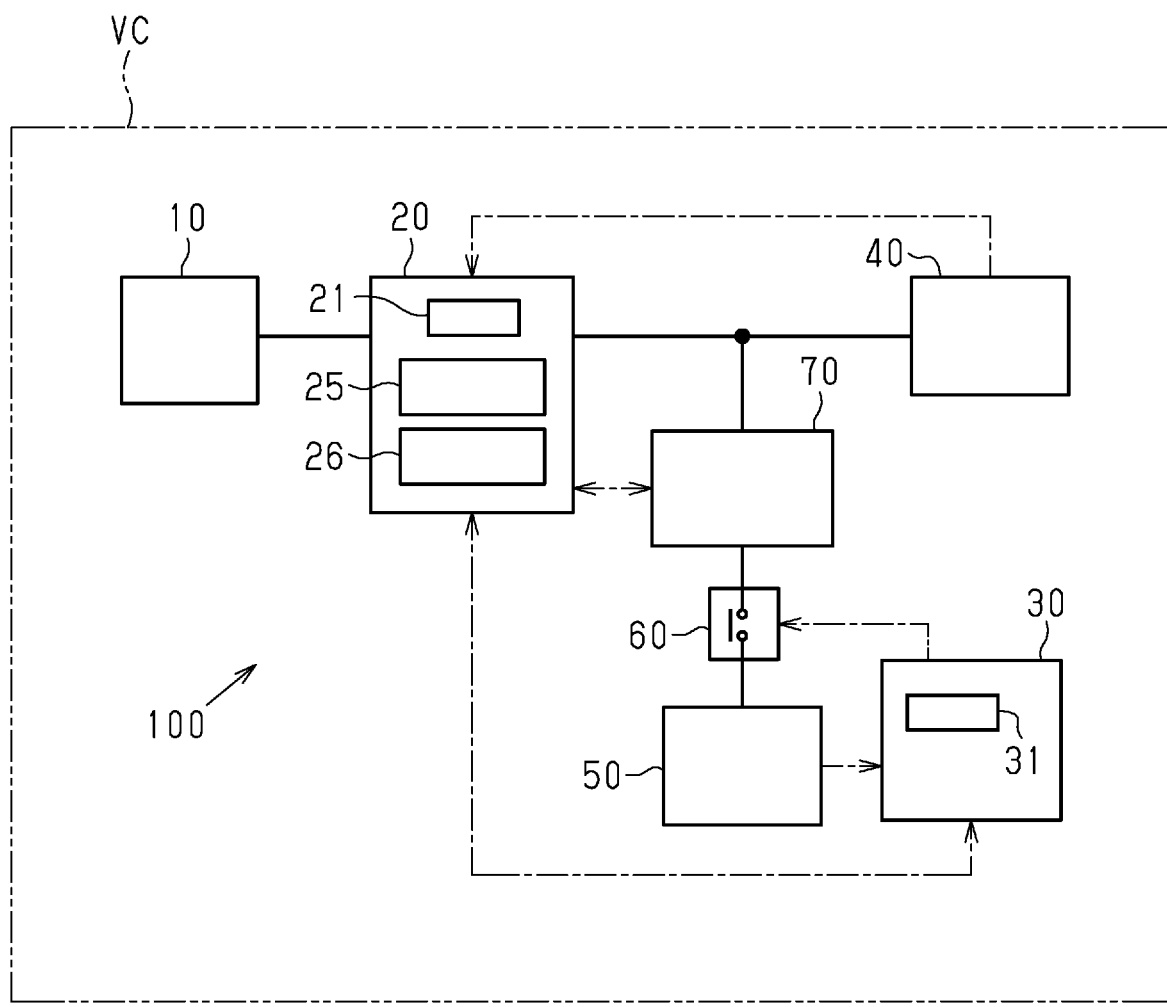
FIG. 1 is a schematic diagram of a solar charging system.

As shown in FIG. 1, the solar charging system 100 includes a solar panel 10, a control unit 20, a battery monitoring unit 30, a first battery 40, a second battery 50, a relay 60, and a third converter 70.

The solar panel 10 is configured in a panel shape by arranging a plurality of solar cells that generate power by irradiation with sunlight. The solar panel 10 is installed on, for example, a roof of the vehicle VC.

The control unit 20 includes a controller 21, a first converter 25, and a second converter 26.

The controller 21 includes a CPU and a storage device. The CPU of the controller 21 executes various types of control such as power generation control of the solar panel 10, charge control of the first battery 40, and charge control of the second battery 50 by executing programs stored in the storage device of the controller 21. The first converter 25 is a DC-DC converter that converts electric power generated by the solar panel 10. The second converter 26 is a DC-DC converter that converts the electric power converted by the first converter 25 and supplies the converted electric power to the first battery 40.

The third converter 70 is a DC-DC converter that converts electric power stored in the first battery 40 and electric power generated by the solar panel 10 and supplies the converted electric power to the second battery 50.

The controller 21 controls driving of the first converter 25, the second converter 26, and the third converter 70.

The battery monitoring unit 30 includes a battery controller 31. The battery controller 31 includes a CPU and a storage device. By executing a program stored in the storage device of the battery controller 31, the CPU of the battery controller 31 monitors the state of the second battery 50 and performs opening/closing control of the relay 60 for charging the second battery 50. The battery controller 31 is connected to the controller 21 so as to be able to communicate with each other. The battery controller 31 transmits a state of the second battery 50 detected by a sensor or the like, that is, an input current, an output current, a voltage, a temperature, and the like of the second battery 50 to the controller 21. The controller 21 transmits an opening/closing instruction signal of the relay 60 to the battery controller 31.

The first battery 40 is a secondary battery that is charged with electric power generated by the solar panel 10, and is, for example, a lithium ion battery. The first battery 40 is not limited to a lithium-ion battery and may be another type of battery. The first battery 40 is an auxiliary battery that supplies electric power to auxiliary devices of the vehicle VC. The auxiliary devices of the vehicle VC are, for example, an electric oil pump, a navigation system, lamps, various sensors, and the like. The controller 21 acquires a state of the first battery 40 detected by a sensor or the like, that is, an input current, an output current, a voltage, a temperature, and the like of the first battery 40. Based on the acquired data, the controller 21 calculates a capacity CH that is a current power storage amount of the first battery 40, a current full charge capacity CHmax of the first battery 40, and a state of charge SOC of the first battery 40. The state of charge SOC is a value obtained by dividing the capacity CH by the full charge capacity CHmax.

The second battery 50 is a secondary battery that is charged with the electric power converted by the third converter 70, that is, the electric power stored in the first battery 40 and the electric power generated by the solar panel 10. The second battery 50 is, for example, a lithium ion battery. The second battery 50 is not limited to a lithium ion battery and may be another type of battery. The second battery 50 is a driving battery that supplies electric power to a motor that drives the vehicle VC.

The relay 60 is provided in a circuit between the third converter 70 and the second battery 50. When the relay 60 is closed, electric power is transmitted and received between the third converter 70 and the second battery 50. When the relay 60 performs the opening operation, the transmission and reception of electric power between the third converter 70 and the second battery 50 are interrupted.

Charging Process Executed by Controller 21

The controller 21 acquires the state of charge SOC of the first battery 40 at prescribed intervals. When the state of charge SOC is greater than or equal to a prescribed upper limit value SOCH, the controller 21 charges the second battery 50 by supplying electric power from the first battery 40 to the second battery 50. When the state of charge SOC of the first battery 40 is less than or equal to a prescribed lower limit value SOCL due to supply of electric power to the second battery 50, the controller 21 stops the supply of electric power from the first battery 40 to the second battery 50. The controller 21 charges the first battery 40 using the electric power generated by the solar panel 10. The controller 21 repeatedly executes such a charging cycle of the first battery 40 while the solar charging system 100 is operating.

The upper limit value SOCH is a predetermined value smaller, by a specified value, than a value at which the first battery 40 is overcharged. The lower limit value SOCL is a predetermined value larger, by a specified value, than a value at which the first battery 40 is overdischarged.

Changing Process Executed by Controller 21

A range from the upper limit value SOCH to the lower limit value SOCL of the state of charge SOC of the first battery 40 corresponds to a range of use UR of the first battery 40. The full charge capacity CHmax of the first battery 40 gradually decreases due to degradation of the first battery 40. Therefore, a capacity range CHR of the first battery 40 in the range of use UR becomes narrower as the degradation of the first battery 40 progresses. The capacity CH of the first battery 40 when the state of charge SOC of the first battery 40 is equal to the upper limit value SOCH is the maximum value of the capacity range CHR, and the capacity CH of the first battery 40 when the state of charge SOC is equal to the lower limit value SOCL is the minimum value of the capacity range CHR. This reduces an amount of electric power EE that can be actually used in the charging cycle of the first battery 40, in which charging and discharging are repeated. The value of the amount of electric power EE is equal to a value obtained by subtracting the minimum value of the capacity range CHR from the maximum value of the capacity range CHR.

Figure 2:
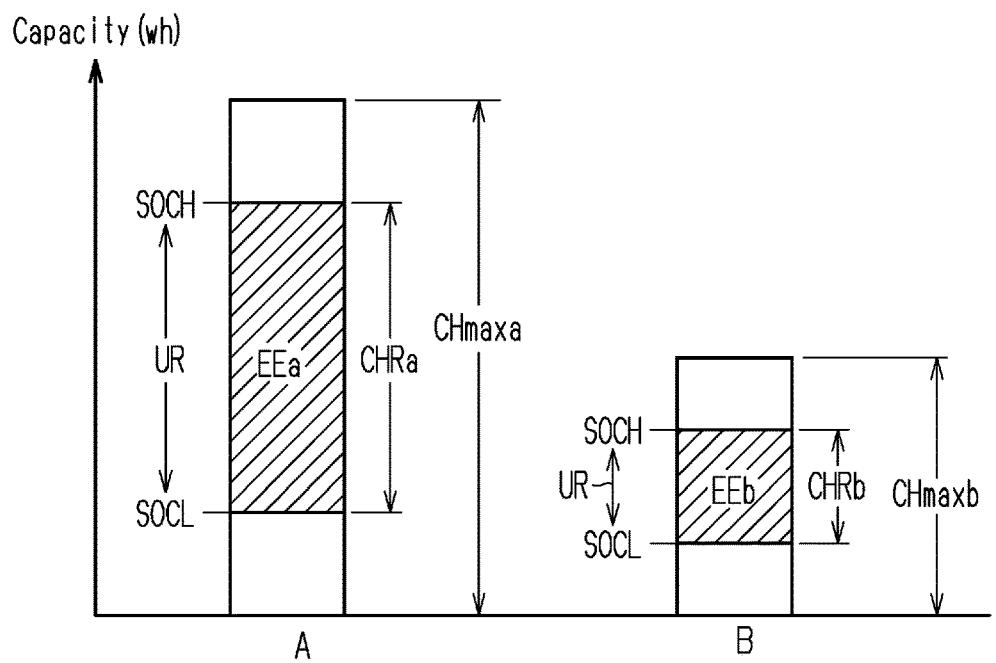
FIG. 2 is a graph showing changes in the capacity of the first battery shown in FIG. 1.

FIG. 2 shows a capacity A of the first battery 40 which is not degraded and a capacity B of the first battery 40 which is degraded. As shown in FIG. 2, the full charge capacity CHmaxb of the degraded first battery 40 is smaller than the full charge capacity CHmaxa of the non-degraded first battery 40. Therefore, even when the upper limit value SOCH and the lower limit value SOCL of the state of charge SOC are the same and the range of use UR is the same, the capacity range CHRb of the degraded first battery 40 is narrower than the capacity range CHRa of the first battery 40 that is not degraded. Therefore, in the charging cycle of the first battery 40, the amount of power EEb that can be actually used by the first battery 40 that has degraded becomes smaller than the amount of power EEa that can be actually used by the first battery 40 that has not degraded.

When the actually usable electric energy EE is reduced in this way, the period of the charging cycle of the first battery 40 is shortened. Therefore, degradation of the first battery 40 and degradation of a circuit that switches between charging and discharging of the first battery 40 may progress. When the cycle of the charging cycle of the first battery 40 becomes short, the period of the charging cycle of the charging of the second battery 50 using the electric power of the first battery 40 may also become short. Therefore, degradation of the second battery 50 and degradation of a circuit that switches between charging and discharging of the second battery 50 may progress.

In this regard, the controller 21 executes a changing process of changing the range of use UR such that the range of use UR is wider when the degree of degradation of the first battery 40 is high than when the degree of degradation is low. By executing the changing process, the controller 21 suppresses a decrease in the amount of electric power EE that can be actually used in the charging cycle of the first battery 40. A case in which "the degree of degradation is high" and a case in which "the degree of degradation is low" mean a relative magnitude relationship when the degrees of degradation in these cases are compared with each other. For example, a case in which "the degree of degradation is high"

corresponds to a case in which "the degree of degradation is a first degree", and a case in which "the degree of degradation is low" corresponds to a case in which "the degree of degradation is a second degree, which is lower than the first degree."

Figure 3:
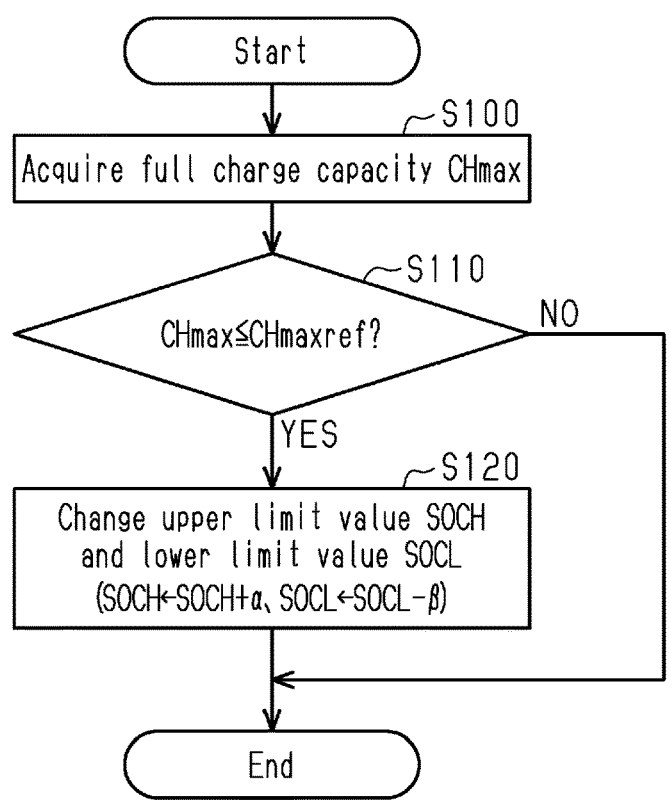
FIG. 3 is a flowchart showing a procedure of processes executed by a controller shown in FIG. 1.

FIG. 3 shows a procedure of a process executed by the controller 21 to execute the changing process. The controller 21 executes this processing at specified intervals during activation of the solar charging system 100. In the following description, the number of each step is represented by the letter S followed by a numeral.

When this process is started, the controller 21 acquires the current full charge capacity CHmax of the first battery 40 (S100).

Next, the controller 21 determines whether or not the acquired full charge capacity CHmax is less than or equal to the reference value CHmaxref (S110). The full charge capacity CHmax decreases as the degradation of the first battery 40 progresses and the degree of degradation increases. Therefore, the full charge capacity CHmax is a value indicating the degree of degradation of the first battery 40. The controller 21 determines that the degree of degradation of the first battery 40 is high enough to increase the range of use UR based on the fact that the full charge capacity CHmax is less than or equal to the reference value CHmaxref. The thresholds CHmaxref are adaptive values.

When it is determined in the process of S110 that the full charge capacity CHmax is less than or equal to the reference value CHmaxref (S110: YES), the controller 21 executes a changing process of changing both the upper limit value SOCH and the lower limit value SOCL (S120). In this changing process, the controller 21 executes a process of setting a value obtained by adding a prescribed value α to the currently set upper limit value SOCH as a new upper limit value SOCH. As the prescribed value α, a value capable of suppressing overcharge of the first battery 40 is set in advance. In addition, in the S120 process, the controller 21 executes a process of setting a value obtained by subtracting the preset value β from the currently set lower limit value SOCL as a new lower limit value SOCL. As the prescribed value β, a value capable of suppressing overdischarge of the first battery 40 is set in advance. When the controller 21 executes the changing process, the value of the upper limit value SOCH becomes larger and the value of the lower limit value SOCL becomes smaller than those before execution of the changing process.

When the processing of the S120 is ended or when a negative determination is made in the processing of the S110, the controller 21 ends the execution of the present processing in the current cycle.

Operation and Advantages of Present Embodiment (1) When the full charge capacity CHmax is less than or equal to the predetermined value CHmaxref, the changing process is executed to increase the upper limit value SOCH and decrease the lower limit value SOCL. Therefore, when the degree of degradation of the first battery 40 is high, the range of use UR is changed so that the range of use UR becomes wider than when the degree of degradation is low.

When the range of use UR becomes wider, the capacity range CHR of the first battery 40 becomes wider in the charging cycle of the first battery 40. Therefore, it is possible to suppress a decrease in the amount of electric power EE that can be actually used in the charging cycle of the first battery 40.

(2) By executing the changing process, it is possible to suppress a decrease in the electric energy EE that can be actually used in the charge cycle of the first battery 40. Therefore, shortening of the period of the charging cycle of the first battery 40 is also suppressed. Therefore, it is also possible to suppress progress of degradation of the first battery 40 and degradation of the circuit that switches between charging and discharging of the first battery 40.

(3) When the period of the charging cycle of the first battery 40 is prevented from being shortened by the changing process, the period of the charging cycle of the charging of the second battery 50 using the electric power of the first battery 40 is also prevented from being shortened. Therefore, it is also possible to suppress progress of degradation of the second battery 50 and degradation of the circuit that switches between charging and discharging of the second battery 50.

Modifications

The present embodiment may be modified as follows. The present embodiment and the following modifications can be combined as long as the combined modifications remain technically consistent with each other.

A value different from the full charge capacity CHmax may be used as the value indicating the degree of degradation of the first battery 40. For example, the longer the cumulative usage time of the first battery 40, the more the degradation of the first battery 40 progresses. Therefore, the cumulative usage time of the first battery 40 may be used as the value indicating the degree of degradation of the first battery 40. In addition, the longer the cumulative travel distance of the vehicle VC, the more the degradation of the first battery 40 progresses. Therefore, the cumulative travel distance of the vehicle VC may be used as a value indicating the degree of degradation of the first battery 40.

As shown in FIG. 4, as the changing process, a process of variably setting the upper limit value SOCH and the lower limit value SOCL may be executed such that the value of the upper limit value SOCH increases and the value of the lower limit value SOCL decreases as the full charge capacity CHmax of the first battery 40 decreases. In this case, it is possible to more precisely suppress a decrease in the amount of electric power EE that can be actually used in the charging cycle of the first battery 40.

In the changing process, the degradation degree of the first battery 40 may be classified, and the value of the upper limit value SOCH and the value of the lower limit value SOCL may be changed such that the range of use UR becomes wider for a class having a higher degradation degree.

Although both the upper limit value SOCH and the lower limit value SOCL are changed in the changing process according to the above-described embodiment, only the upper limit value SOCH or only the lower limit value SOCL may be changed.

In the above embodiment, the range of use UR is changed based on the degradation degree of the first battery 40. However, the range of use UR may be changed based on other requirements.

For example, the range of use UR may be changed based on the temperature of the first battery 40. More specifically, when the temperature of the first battery 40 is high, it is conceivable to suppress the input current and the output current of the first battery 40 in order to suppress the temperature rise. When the input current and the output current of the first battery 40 are suppressed, it is desirable to increase the voltage of the first battery 40 in order to suppress a decrease in the amount of electric power. Therefore, if the voltage of the first battery 40 is increased by increasing the upper limit value SOCH of the range of use UR to expand the range of use UR, the amount of electric power can be secured while suppressing the temperature rise of the first battery 40.

Further, for example, when the temperature of the first battery 40 is low, the apparent capacity of the first battery 40 tends to decrease. Therefore, when the temperature of the first battery 40 is low, the range of use UR is made wider than when the temperature is high, thereby making it possible to suppress a decrease in the amount of electric power EE that can be actually used in the charging cycle of the first battery 40.

For example, the range of use UR may be changed in order to suppress degradation of a circuit such as a relay circuit that switches between charging and discharging of the first battery 40 and degradation of a circuit such as a relay circuit that switches between charging and discharging of the second battery 50. When the range of use UR is widened, the period of the charging cycle of the first battery 40 is prevented from being shortened. Therefore, since an increase in the number of times of switching between charging and discharging of the first battery 40 is suppressed, degradation of a circuit that switches between charging and discharging of the first battery 40 is suppressed. When the shortening of the period of the charging cycle of the first battery 40 is suppressed, the shortening of the period of the charging cycle of the charging of the second battery 50 using the electric power of the first battery 40 is also suppressed. Therefore, since an increase in the number of times of switching between charging and discharging of the second battery 50 is suppressed, degradation of a circuit that switches between charging and discharging of the second battery 50 is suppressed.

Therefore, the controller 21 estimates the degree of degradation of the switching circuit that switches between charging and discharging of the first battery 40 or the second battery 50 based on, for example, the cumulative activation time of the solar charging system 100 or the number of times of switching between charging and discharging in the switching circuit. When the estimated degradation degree of the switching circuit is high, the controller 21 may execute a process of changing the range of use UR so that the range of use UR becomes wider than that when the degradation degree is low. When such a changing process is executed, it is possible to suppress the speed at which the degradation of the switching circuit progresses.

Although the first battery 40 is an auxiliary battery that supplies electric power to an auxiliary machine of the vehicle VC, the first battery 40 may be a battery used for other purposes.

The second battery 50 is a driving battery that supplies electric power to the motor that drives the vehicle VC, the second battery 50 may be a battery used for other purposes.

Although the battery controller 31 controls the opening and closing of the relay 60, the controller 21 may directly control the opening and closing of the relay 60.

The third converter 70 may be provided in the control unit 20.

The battery controller 31 may be provided in the control unit 20.

Although the solar charging system 100 is applied to the vehicle VC, it may be applied to something other than the vehicle VC.

The controller 21 is not limited to a device that includes a CPU and a storage device and executes software processing. For example, the controller 21 may include hardware circuits, for example, an application-specific integrated circuit (ASIC)), dedicated to executing at least part of the processes executed by the software in the above-described embodiment. That is, the controller 21 may be modified as long as it includes processing circuitry that has any one of the following configurations (a) to (c). (a) Processing circuitry including at least one processor that executes all of the above-described processes according to programs and at least one program storage device such as a ROM that stores the programs. (b) Processing circuitry including at least one processor and at least one program storage device that execute part of the above-described processes according to the programs and at least one dedicated hardware circuit that executes the remaining processes. (c) Processing circuitry including at least dedicated hardware circuit that executes all of the above-described processes. The program storage device, which is a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A solar charging system, comprising:
   a solar panel;
   a first battery configured to store electric power generated by the solar panel;
   a second battery configured to store electric power supplied from the first battery; and
   processing circuitry, wherein
   the processing circuitry is configured to
      charge the second battery by supplying electric power from the first battery to the second battery when a state of charge of the first battery is greater than or equal to a prescribed upper limit value, and
      charge the first battery by stopping supply of electric power from the first battery to the second battery when the state of charge of the first battery is less than or equal to a prescribed lower limit value,
   a range from the upper limit value to the lower limit value of the state of charge of the first battery is a range of use of the first battery,
   the processing circuitry is configured to execute a changing process of changing the range of use such that the range of use is wider when a degree of degradation of the first battery is high than when the degree of degradation is low, and
   the changing process is a process of increasing a value of the upper limit value and reducing a value of the lower limit value as compared with values before execution of the changing process.

2. The solar charging system according to claim 1, wherein the changing process is a process of changing the range of use such that the range of use becomes wider as the degree of degradation of the first battery increases.

3. The solar charging system according to claim 1, wherein the first battery is an auxiliary battery configured to supply electric power to an auxiliary device of a vehicle.

4. The solar charging system according to claim 1, wherein the second battery is a driving battery configured to supply electric power to a motor configured to drive a vehicle.

5. The solar charging system according to claim 1, wherein the upper limit value is a predetermined value smaller, by a first specified value, than a value at which the first battery is overcharged, and the lower limit value is a predetermined value larger, by a second specified value, than a value at which the first battery is overdischarged.

6. The solar charging system according to claim 1, wherein the processing circuitry is configured to determine that the degree of degradation of the first battery is high based on a full charge capacity of the first battery being less than or equal to a predetermined reference value, and to execute the changing process.

7. The solar charging system according to claim 1, wherein the changing process includes a process of setting a value obtained by adding a first prescribed value to the upper limit value as a new upper limit value and a process of setting a value obtained by subtracting a second prescribed value from the lower limit value as a new lower limit value.

* * * * *